April 23, 1968  B. MACKENZIE  3,379,267
MAGNETIC-PNEUMATIC CONTROLLED DISCHARGE VALVE
Filed Jan. 14, 1966  2 Sheets-Sheet 1

BENJAMIN MACKENZIE
By: Norris + Bateman
Atty

April 23, 1968   B. MACKENZIE   3,379,267
MAGNETIC-PNEUMATIC CONTROLLED DISCHARGE VALVE
Filed Jan. 14, 1966   2 Sheets-Sheet 2

INVENTOR
BENJAMIN MACKENZIE

By: Norris + Bateman
attys

United States Patent Office 3,379,267
Patented Apr. 23, 1968

3,379,267
MAGNETIC-PNEUMATIC CONTROLLED DISCHARGE VALVE
Benjamin Mackenzie, Harrow, England, assignor to Driver Southall Limited, South Ruislip, England, a British company
Filed Jan. 14, 1966, Ser. No. 520,599
Claims priority, application Great Britain, Jan. 22, 1965, 2,841/65
8 Claims. (Cl. 177—108)

ABSTRACT OF THE DISCLOSURE

A weigh pan carried by a conventional weighbeam has a material receiving body closed by a pivoted discharge door that swings toward shut condition under the influence of gravity and is positively retained shut by a magnetic means. When a suitable material weight is in the pan, the door is positively swung open by an agency other than the magnetic means and which acts with enough force to overcome the holding force of the magnetic means. This agency may be an air jet impinging on the door remote from its pivot, or may be an electromagnetic device such as a plunger acting through a system of links connected to the door.

---

This invention relates to weighing apparatus of the kind wherein material is delivered to and weighed within a weight pan so as to be discharged through a door in the pan when a given load of material is present in the pan.

The invention has for its object the provision of a pan door and operating means therefor, which ensure a reliable closing of the door and its subsequent opening with low force upon the apparatus.

In accordance with the invention, in a weighing apparatus a weigh pan comprises a material-receiving body having a discharge door, permanent magnetic means for retaining the door in a closed position, and opening means for effecting opening of the discharge door against the action of the permanent magnetic means.

The opening means may comprise an air jet nozzle directed towards a part of or extension from the discharge door so that impingement of the air jet on said part or extension effects opening of the discharge door. Alternatively the opening means can comprise a lever system secured to or abutting a part of the discharge door and operable by a mechanically or electrically actuated member.

Preferably the magnetic means comprises a permanent magnet mounted on the body or the door, and a pole piece of ferromagnetic material mounted on the door or the body corespondingly in a position within the attractive influence of the permanent magnet when the door is in the closed position.

Figure 1:
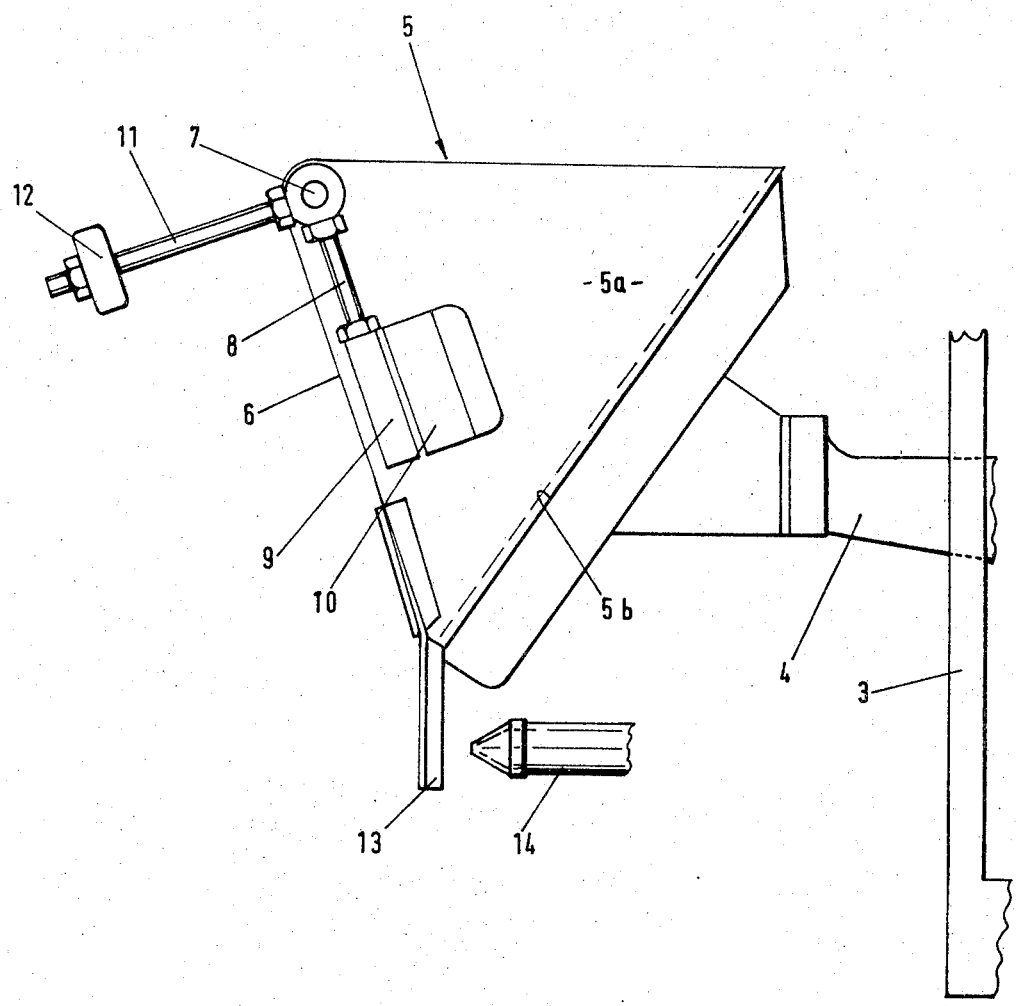
Figure 2:
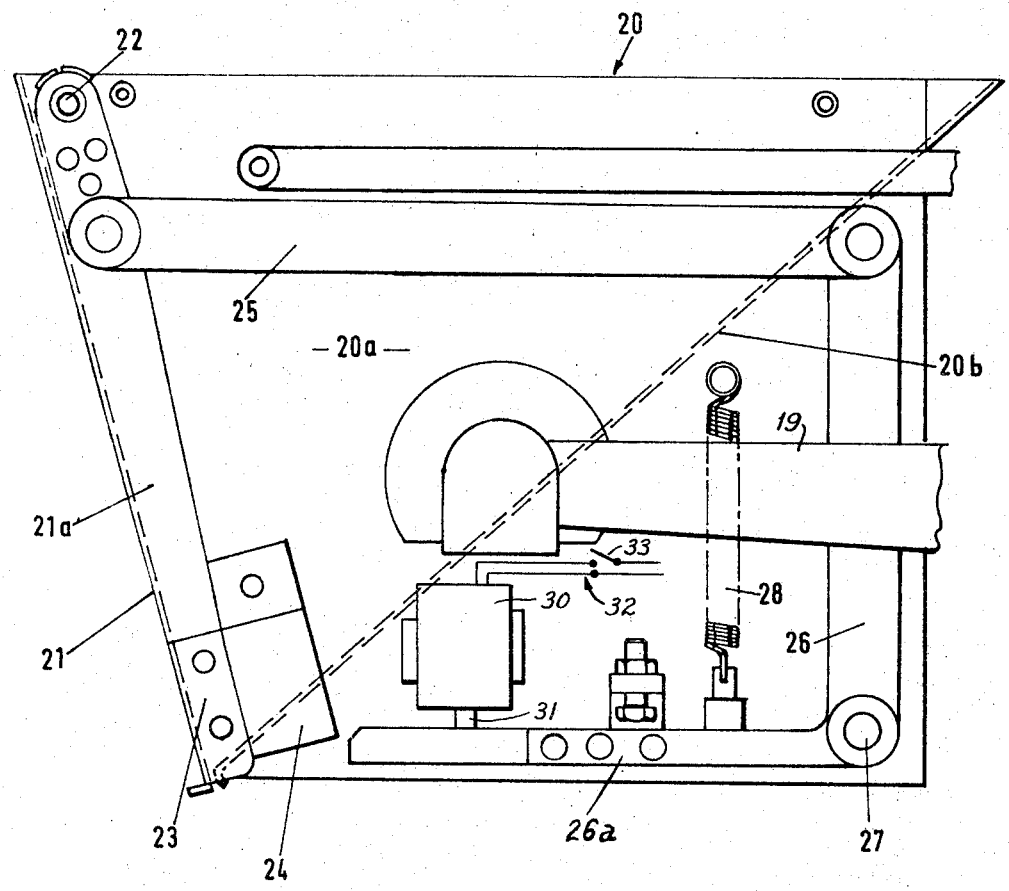

Two typical examples of the practical realisation of the invention are illustrated in the accompanying drawings wherein:

FIGURE 1 is a side view of parts of the first example of the weighing apparatus according to the invention and FIGURE 2 is a similar view to FIGURE 1 but showing the second example of the invention.

Referring to FIGURE 1, the weighing apparatus comprises a framework 3 in which is pivoted a weighbeam 4 provided at one end with a weigh pan 5 and at the other end with counter-balancing means (not shown).

The weigh pan 5 comprises a body having a pair of parallel upright V-shape side walls 5a and an intermediate inclined rectangular rear wall 5b. A rectangular front wall 6, constituting a discharge door, is fixed along its upper edge to a pivot rod 7 journalled in the side walls 5a.

The pivot rod 7 is provided with a first arm 8 projecting parallel with the plane of the discharge door and carrying a pole piece 9 of ferro-magnetic material. Mounted on a side wall 5a is a permanent magnet 10 disposed almost in contact with the pole piece 9 when the door 6 is in its closed position. The magnetic attraction between the magnet 10 and the pole piece 9 retains the door in the closed position.

The pivot rod 8 also carries a second arm 11 perpendicular to the first arm 8 and carrying an adjustable counterweight 12 serving to bias the door from an open position to a position wherein the magnet 10 is able to close and retain the door.

The discharge door 6 is provided with a downwardly depending rigid extension 13 which, in the closed position of the door, faces towards a jet nozzle 14 connected to a source of compressed air.

In operation, material is delivered into the weigh pan 5 and each time that the pan is to be emptied, compressed air is allowed to pass through the jet nozzle 14 to impinge against the extension 13 so causing the door 6 to swing outwardly from its closed position and removing the pole piece 6 from the influence of the magnet 10. The jet of air is maintained for as long as necessary for the pan contents to empty under gravity action, whereupon the jet is cut off and the counterweight 12 swings the door 6 to a position wherein the pole piece 9 is drawn towards the magnet 10 and the attraction between these parts is sufficient to retain the door closed.

In the second typical example of the invention illustrated in FIGURE 2, the weighing apparatus is constructed in a generally similar manner to that described above. The weigh pan body 20 comprises two side walls 20a, an inclined rear wall 20b, and a front wall 21, constituting a discharge door, pivoted at 22 to the side walls 20a, to define a pan of rectangular horizontal cross-section and of V-shape in vertical section through the rear and front walls with rearward and downward extension of the side walls beyond the rear wall as appears in the drawing.

The discharge door 21 is formed with side flanges 21a which overlap the front marginal parts of the side walls 20a. Each side wall 20a is provided with a pole piece 23 of ferro-magnetic material remote from the pivot 22 and lying close to but separate from a corresponding one of two permanent magnets 24 secured to the side walls 20a when the discharge door is in a closed position. The magnets retain the door in the closed position.

Pivotally mounted on each side flange 21a, adjacent the pivot 22, is a pair of approximately horizontal links 25 extending across the pan side walls 20a to pivotally connect with the upper ends of the upright limbs of a pair of bell crank levers 26 pivoted to the extensions of the side walls at 27. The other limbs of the bell crank levers extend horizontally towards the permanent magnet and are urged upwardly by springs 28 to pull the links 25 and hence swing the door towards its closed position. A mechanically or electrically actuated member (not shown) is provided to pull the free ends of the horizontal limbs of the bell crank levers downwardly against the spring action so as to push the links 25 in the direction of the discharge door, hence causing the door to swing open sufficiently to take the pole pieces 23 beyond the influence of the magnets 24. Upon release by the mechanically or electrically actuated member, the spring action swings the door towards the closed position whereupon magnetic attraction between the permanent magnets 24 and the pole pieces 23 draws the door into and retains the door in the closed position.

Weigh pan body 20 is suitably carried by a weighbeam 19. The horizontal arms 26a of the bell crank levers 26 may be depressed to overcome the holding force of the magnetic coupling 23, 24 by a pair of suitable electromagnetic units 30 having plungers 31 that thrust against the arms when energized by the circuit indicated at 32. The circuit may contain a switch 33 closed to energize units 30 when the weigh pan contains a suitable amount of material. This circuit and the electromagnetic units are disclosed as illustrative and their details do not form part of the invention.

It will be realised that the relative positions of the magnets and pole pieces can be reversed without affecting the mode of operation.

The weigh pans described above are particularly suited for use in light weighments of readily flowable light material, and the light forces necessary to open the doors result in much less wear upon the knife edge bearings of the apparatus than is the case with conventional spring catches.

I claim:

1. Weighing apparatus incorporating a weigh pan comprising a material-receiving body, having a movable discharge door, permanent magnetic means for retaining the door in a closed position, and door opening means distinct from said magnetic means for selectively exerting force against said door for effecting opening of the discharge door against the holding action of the permanent magnetic means.

2. Weighing apparatus according to claim 1 wherein the magnetic means comprises magnet and pole piece members mounted one on the pan body and the other on the door.

3. Weighing apparatus according to claim 1 wherein the door is pivotally mounted about a horizontal axis in the vicinity of its upper end on the pan body and is adapted to swing toward said closed position under the influence of gravity.

4. Weighing apparatus according to claim 1, said door opening means comprising an air jet nozzle directed towards a part rigid with the discharge door so that impingement of the air jet on said part forcibly effects opening of the discharge door.

5. Weighing apparatus according to claim 3 comprising an adjustable counterweight mounted on the door so as to bias the door from an open position towards its closed position.

6. Weighing apparatus according to claim 1 comprising a lever and link system connecting the pan body and door mounted in operative association with said door opening means and operable to open the door.

7. Weighing apparatus according to claim 6 comprising spring means connected to said body and operable to bias the door from an open position towards its closed position.

8. Weighing apparatus according to claim 6, said system comprising a bell crank lever pivotally mounted on the pan body and a link pivotally connecting an upper end of an upright arm of the lever to the door, a tension spring connecting a horizontal arm of the lever to the body, and a free end of the horizontal lever arm being responsive to downward pressure from said door opening means to open the door.

References Cited

UNITED STATES PATENTS

| | | | |
|---|---|---|---|
| 955,693 | 4/1910 | Richardson | 177—110 X |
| 2,646,904 | 7/1953 | Chodziesner | 177—110 X |
| 2,842,330 | 7/1958 | Hopkins | 177—108 |

FOREIGN PATENTS

| | | |
|---|---|---|
| 531,329 | 12/1929 | Germany. |
| 123,887 | 1/1949 | Sweden. |

RICHARD B. WILKINSON, *Primary Examiner.*

G. H. MILLER, JR., *Assistant Examiner.*